United States Patent [19]
Wilkens

[11] Patent Number: 5,664,826
[45] Date of Patent: Sep. 9, 1997

[54] LIGHT WEIGHT TRAILER WALLS WITH SMOOTH SURFACES

[76] Inventor: Arthur L. Wilkens, 312 N. Walnut, Stockton, Kans. 67669

[21] Appl. No.: 630,059

[22] Filed: Apr. 12, 1996

[51] Int. Cl.⁶ .................................................. B60R 27/00
[52] U.S. Cl. ........................... 296/181; 296/191; 296/29; 52/270; 52/582.1
[58] Field of Search ........................... 296/181, 191, 296/29; 52/588.1, 582.1, 270, 271

[56] References Cited

U.S. PATENT DOCUMENTS

| | | |
|---|---|---|
| 2,910,322 | 10/1959 | Magor . |
| 2,934,372 | 4/1960 | Jewell et al. . |
| 3,042,157 | 7/1962 | Dorfman . |
| 3,205,632 | 9/1965 | McCormick . |
| 3,777,430 | 12/1973 | Tischuk ........................... 52/588.1 |
| 3,817,011 | 6/1974 | Weed ............................... 52/588.1 |
| 3,886,705 | 6/1975 | Cornland ....................... 52/588.1 |
| 4,252,067 | 2/1981 | Stark . |
| 4,283,898 | 8/1981 | Claver . |
| 4,840,127 | 6/1989 | Tomaka . |
| 4,940,279 | 7/1990 | Abott et al. . |
| 4,958,472 | 9/1990 | Ehrlich . |
| 5,204,149 | 4/1993 | Phenicie et al. ................. 52/588.1 |
| 5,301,798 | 4/1994 | Wilkens . |

FOREIGN PATENT DOCUMENTS

| | | | |
|---|---|---|---|
| 151550 | 8/1985 | European Pat. Off. ............... 296/29 |
| 2752286 A1 | 5/1979 | Germany ............................ 52/588.1 |
| 3529662 | 2/1987 | Germany ............................ 296/191 |

*Primary Examiner*—Gary C. Hoge
*Attorney, Agent, or Firm*—Reising, Ethington, Barnard & Perry

[57] ABSTRACT

A trailer 10 has a frame 12 with cross members (20). A bottom rail (62) is secured to the frame 12. A top rail (130) is supported by the frame. A plurality of extruded panels (70) are attached to the bottom rail 62 and the top rail (130) to form side walls (22 and 24) and a front wall (26). Each panel (7) is a hollow member with an outside wall 72, and inside wall (74), a first end wall 76 and a second end wall (78). A first outside flange (80) and a first inside flange (82) are integral with the first end wall (76). A second outside flange (90) and a second inside flange (92) are integral with the second end wall (78). When plural panels (70) are connected together to form a trailer wall (22, 24, or 26) first inside flanges (82) are between second inside and outside flanges (90, 92) and second inside flanges (92) are between first inside and outside flanges (80, 82). A passage (99) is formed between adjacent first and second inside flanges (82 and 92) and end walls (76 and 78). The panels (70) form smooth continuous surfaces on the inside and outside trailer walls (22, 24 and 26).

10 Claims, 4 Drawing Sheets

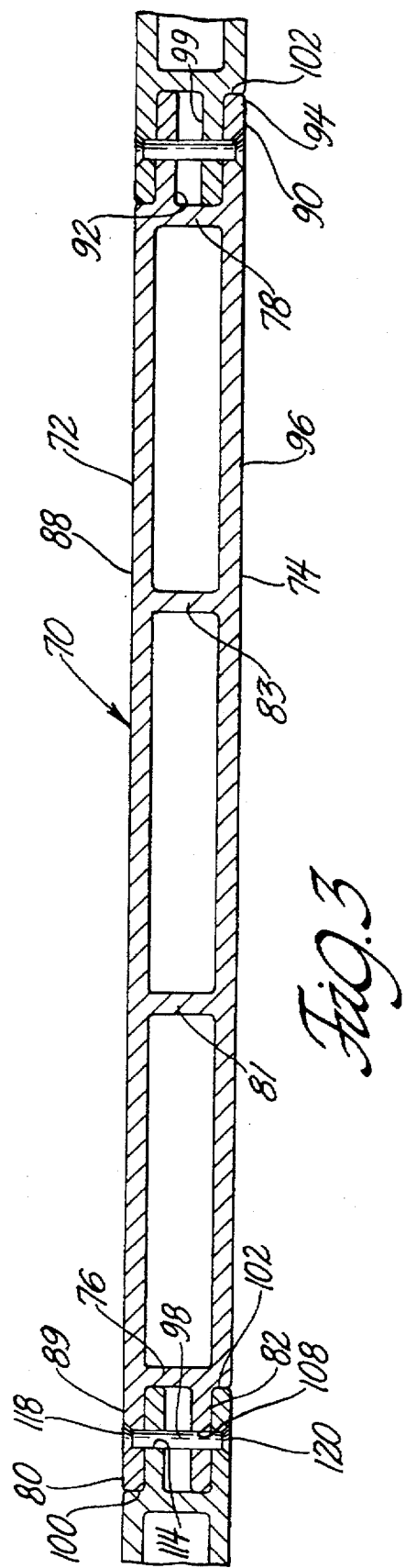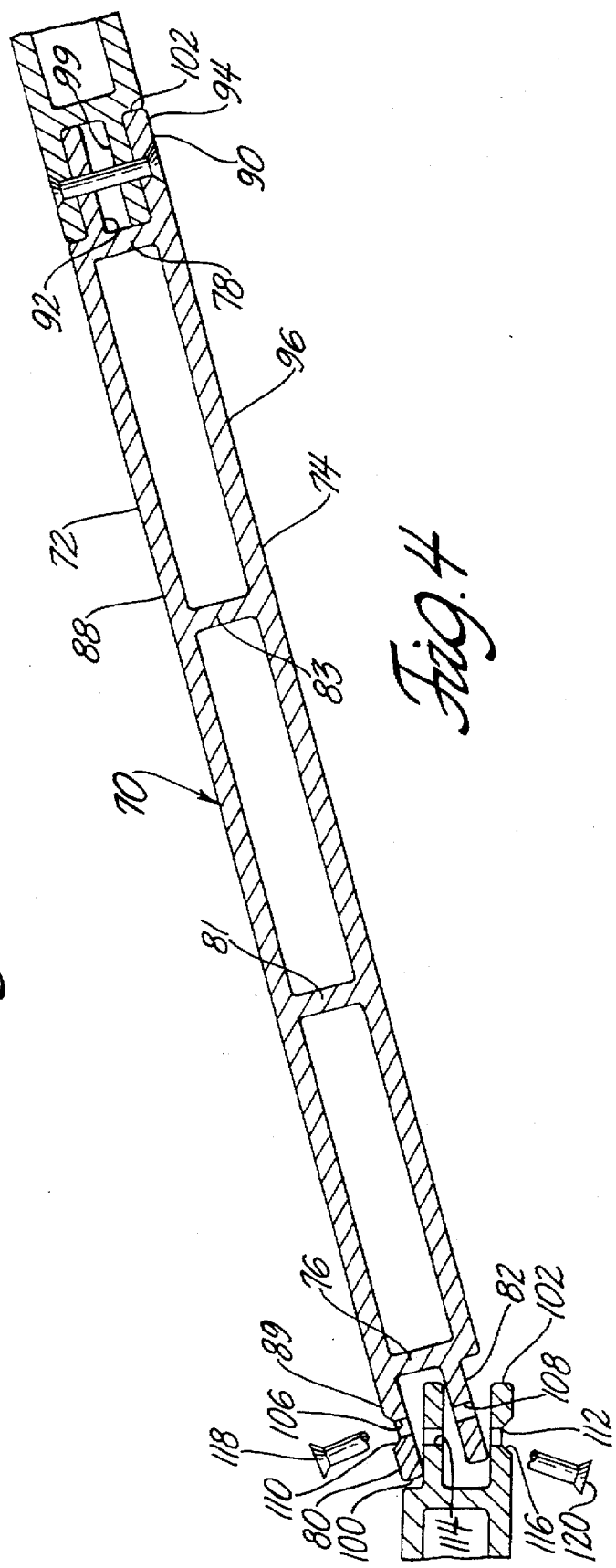

LIGHT WEIGHT TRAILER WALLS WITH SMOOTH SURFACES

BACKGROUND OF THE INVENTION

(1) Technical Field

The subject invention is related to light weight panels that form the walls of a cargo trailer and more particularly to extruded hollow panels that are connected together to form an inside wall surface in a continuous vertical plane and an outside surface in a continuous vertical plane.

(2) Description of the Prior Art

Trailers and cargo bodies mounted on trucks have employed walls with a variety of different constructions. The construction used has been dependent on the material to be transported, weight restraints, material available for wall construction, cost, available fabrication equipment, customer demand and other factors. Little or no consideration has been given to repairability. Purchasers do not expect to damage the walls of their trailers and truck bodies so minimal consideration has been given to repairability.

The walls of many trailers have internal vertical frame members and an outside sheet metal cover connected to the frame members. Where weight is not a paramount consideration the inside can be lined with plywood. Plywood panels can be removed and replaced as required. When weight is a consideration, a sheet metal cover also lines the inside of the frame. To reduce problems caused by water leaks some manufacturers have installed metal sheets that extend from the front to the rear on both the inside and the outside. If one of the outside metal sheets is damaged, it may be necessary to remove all the rivets from an inside sheet to obtain access to the rivets for the outside sheet, replace the outside sheet and then reattach the inside sheet. Removal and replacement of rivets is a time consuming and costly process. Making such a repair may exceed ten percent of a cost of a new trailer and take several days to complete. The rivets employed in wall construction can damage cargo packages and cargo at times. With thin metal panels, the heads of rivets cannot be countersunk.

There are trailers and truck mounted cargo containers that have frame or stake members that are exposed on the outside and have metal panels secured to the inside surfaces. These trailers can be repaired and are relatively light weight. However, the exposed stake members create substantial wind resistance, reduce fuel mileage and increase operating cost. A moisture leak around any of the rivets connecting the inside metal panels to the stakes may lead to water damaged cargo.

The walls of trailers have also been made from one piece fiberglass reinforced plywood (FRP) panels. These panels have a plywood core encased in a tough reinforced resin cover. Many of the drawbacks of the above described trailer wall constructions are eliminated by the FRP panels. They have sufficient strength to eliminate stakes and other reinforcing members. The surfaces of the panels are smooth on the inside and outside. Unfortunately FRP panels also have major disadvantages. They are heavy, difficult to ship and expensive. Special handling equipment is required to assembly a trailer with wall panels that can be over 8 feet high, 60 feet long, heavy, and have slick surfaces. If an FRP panel is damaged and has to be replaced it will most likely have to be returned to the factory where it was built for repair or at least to a facility that has equipment similar to the equipment found in the factory.

SUMMARY OF THE INVENTION

An object of the invention is to provide a trailer with walls constructed from a plurality of interlocking panels. Another object of the invention is to provide a trailer with walls constructed from a plurality of panels that form a smooth continuous inside surface and a smooth continuous outside surface. A further object of the invention is to provide a trailer with walls constructed from interlocking panels which permit disengagement and replacement of a damaged panel while both ends of the wall remain secured to the trailer. A still further object of the invention is to provide interlocking joints between wall panels with double seals and an internal drain passage to eliminate the passage of water between the panels.

In the following summary, the term "inside" means in a direction toward a vertical plane through the center of each panel in a wall and the term "outside" means in a direction away from the vertical plane.

The trailer has a frame with a plurality of cross members. Bottom rails are attached to each side of the frame and to the front of the frame. A plurality of vertical interlocking panels are secured to the bottom rails. Top rails are attached to the top portions of the panels on each side of the frame and on the front of the frame.

The vertical interlocking panels are hollow extruded members. Each panel has an outside wall, an inside wall, a first end wall and a second end wall. A first vertical outside flange and a first vertical inside flange are both integral with the first end wall. A second vertical outside flange and a second vertical inside flange are integral with the second end wall. Two panels which are interlocked and fastened together have the first inside flange of one of the two panels between the second outside flange and the second inside flange of the other panel and have the second inside flange of the other panel between the first inside flange and the first outside flange of the one panel. Mechanical fasteners that pass through the first and second outside flanges hold a surface of the first outside flange in a plane that includes an outside surface of each of the two panels and holds a surface of the second outside flange in a plane that includes an inside surface of each of the two panels. When two panels are secured together as described the first inside flange is spaced from the second inside flange and a passage is formed between the first and second inside flanges and the adjacent first and second end walls. This passage provides a discharge channel for any foreign matter that enters the joint between two adjacent panels and protects cargo carried in the trailer. The fasteners that pass through the first and second outside flanges of two adjacent panels have ends that are fully received in countersunk bores in the outside flanges. With the fastener heads in countersunk bores, inside and outside surface of the panels are in parallel spaced apart planes. The surface of each plane is flat smooth and essentially continuous.

The normally spaced apart inside flanges allow panels to pivot about vertical axis relative to each other when fasteners are removed from three or more adjacent panels. Removal of the fasteners from several panels will allow sufficient movement to release one or more panels for replacement or repair.

BRIEF DESCRIPTION OF THE DRAWINGS

Other advantages of the present invention will be readily appreciated as the same become better understood by reference to the following detailed description when considered in connection with the accompanying drawings, wherein:

FIG. 3 is an enlarged sectional view of a trailer wall taken along line 3—3 in FIG. 1 showing a panel and a portion of a panel secured to each edge of the panel;

FIG. 4 is a sectional view similar to FIG. 3 with the fasteners removed from one of the joints between two adjacent panels.

DETAILED DESCRIPTION OF PREFERRED EMBODIMENTS

In the following description the term "inside" will mean in a direction toward the cargo holding area and the term "outside" will mean in a direction away from the cargo holding area. The terms "front and rear" are as observed when the cargo container is moving in its normal direction of movement. The terms "left and right" are as seen by the driver of a towing or hauling vehicle when seated in the operator's seat.

Figure 1:
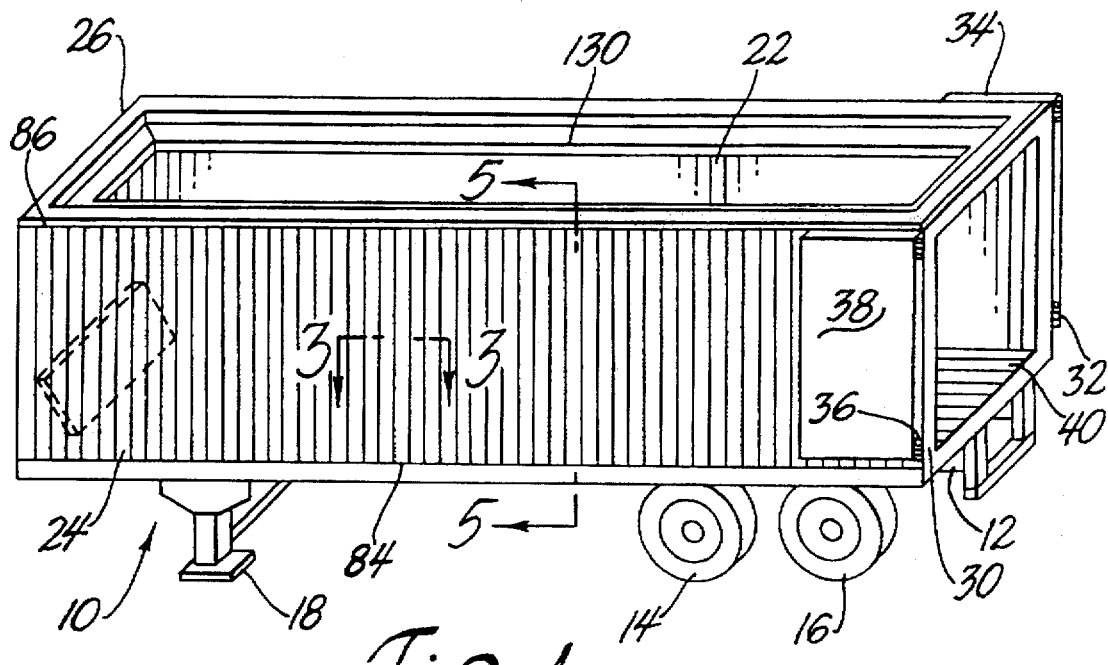
FIG. 1 is perspective view of a semi trailer having walls constructed from hollow extruded panels.

The trailer 10 as shown in FIG. 1 is a semi trailer with a frame 12 supported by two axle assemblies 14 and 16 at the rear. The front part of the frame 12 is supported by a landing gear assembly 18 as shown. While transporting cargo, a vertical king pin (not shown) under the frame 12 and forward of the landing gear assembly 18 is attached to a fifth wheel on a towing vehicle. The towing vehicle supports the front of the trailer and the landing gear assembly 18 is retracted.

Figure 2:
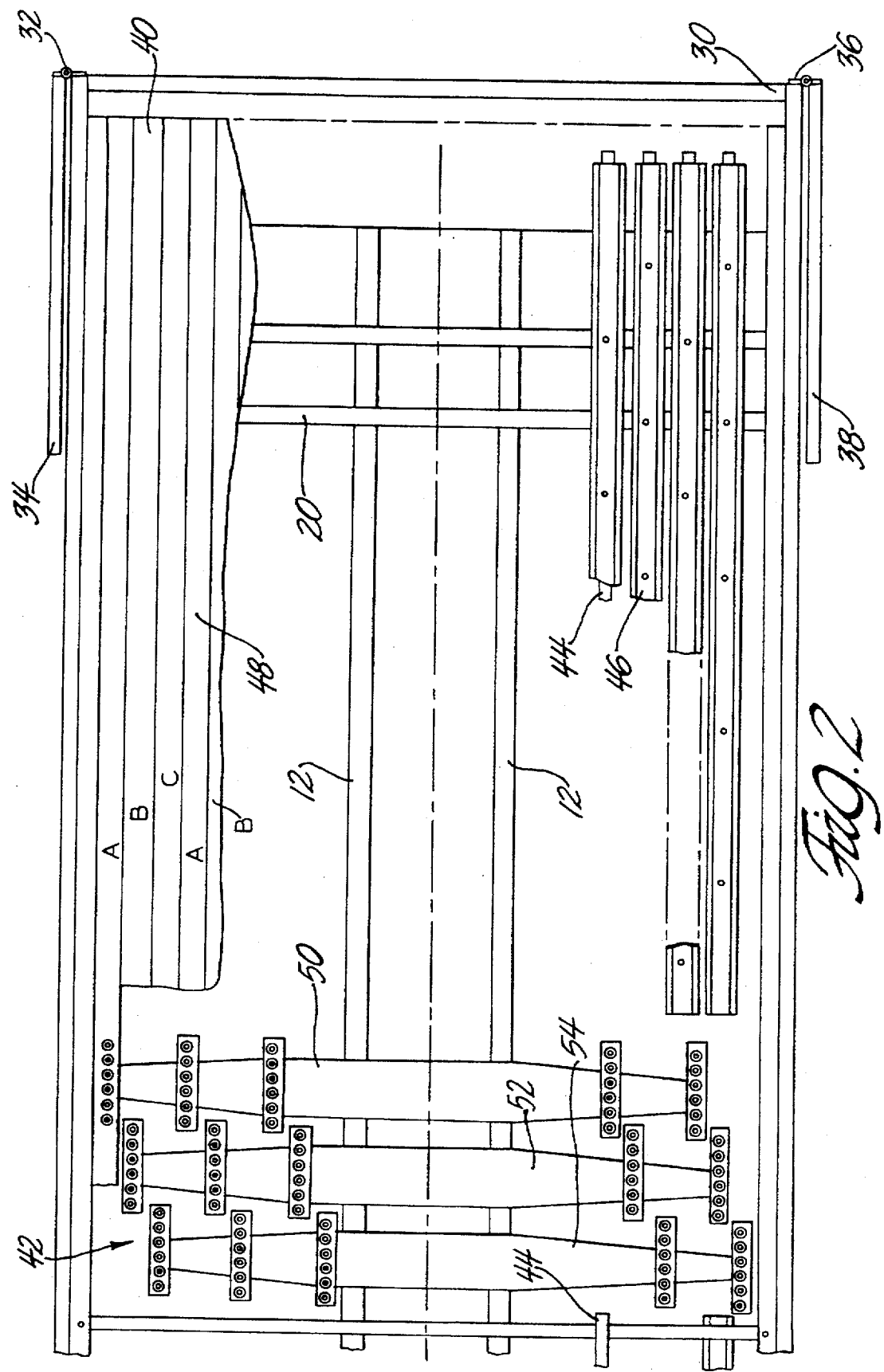
FIG. 2 is an enlarged plan view a portion of the trailer shown in FIG. 1.
Figure 5:
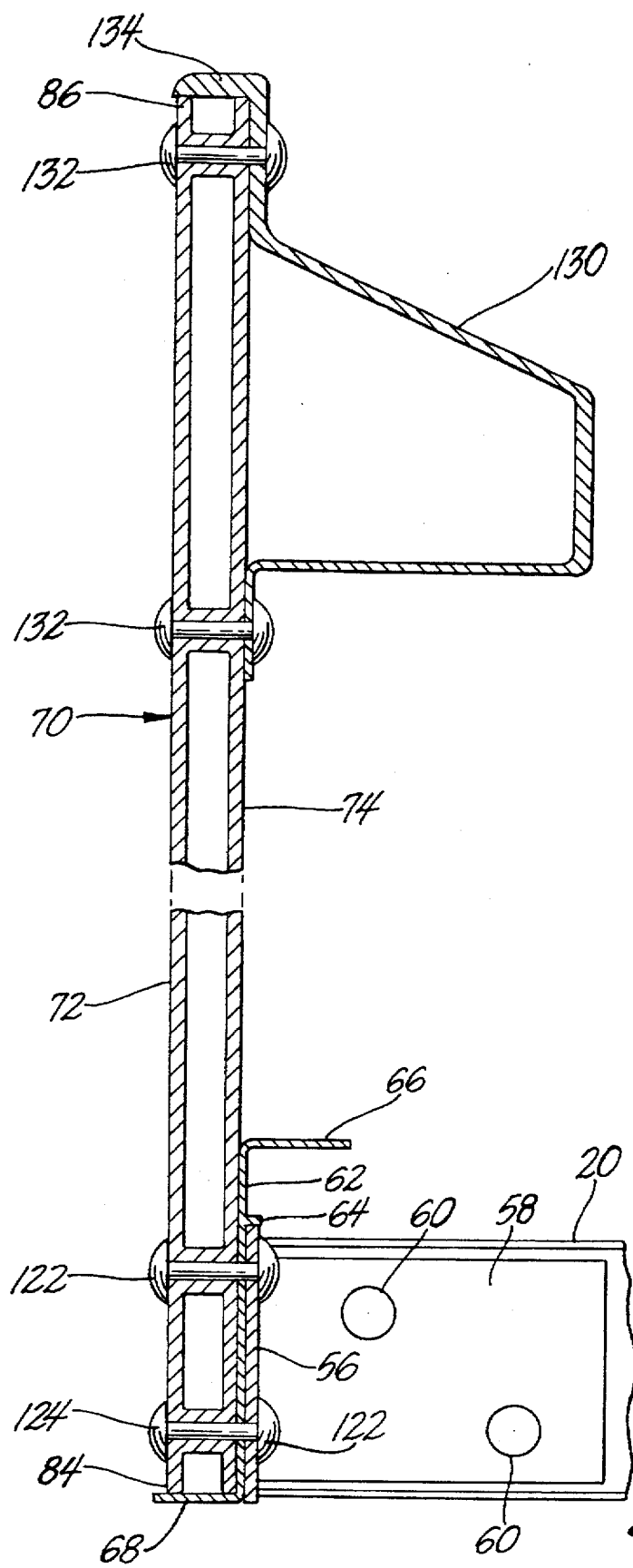
FIG. 5 is an enlarged section view of a trailer wall taken along line 5—5 in FIG. 1.

The frame 12 includes a plurality of I-beam cross members 20 shown in FIGS. 2 and 5. The trailer 10 has a right side wall 22, a left side wall 24 and a front wall 26 supported by the frame 12. A door frame 30 is supported by the frame 12 at the rear of the trailer 10. Hinges 32 pivotally attach a right door 34 to the door frame 30. Hinges 36 pivotally attach the left door 38 to the door frame 30. The doors 34 and 38 are in an open position for unloading as shown in FIG. 1. The floor assembly 40 of the trailer 10 as shown in FIGS. 1 and 2 is a reciprocating floor conveyor assembly 42.

Reciprocating floor conveyor assemblies 42 as shown in FIG. 2, include a plurality of fore and aft extending guide tubes 44 fixed to the cross members 20. Bearings 46 are attached to the guide tubes 44. Floor slats 48 are slidably supported by the bearings 46. Every third floor slat 38 is an A group slat and is attached to the first drive beam 50. Floor slats 48 in the B group are attached to the second drive beam 52. Floor slats in the C group are attached to the third drive beam 54. Hydraulic cylinders (not shown) move all three drive beams 50, 52 and 54 to the rear simultaneously to move all floor slats 48 to the rear and carry cargo supported by the slats to the rear for discharge. The floor slats 48 are in a rear position as shown in FIGS. 1 and 2. The third drive beam 54 is then moved forward and away from the door frame 30 while the first and second drive beams 50 and 52 remain fixed. Cargo supported by the floor slats 48 remains fixed with the stationary slats in the A and B groups. A second drive bar 58 is then moved forward taking the B group floor slats to the front while the A and C groups remain stationary. The first drive bar 50 is then moved forward along with the attached A group of floor slats 48 while the B and C group floor slats remain fixed. The three drive beams 50, 52, and 54 are then ready to be moved to the rear simultaneously taking all the floor slats 48 and cargo with them and starting the conveying cycle over. The conveying cycle continues until the trailer 10 is unloaded. Operation of the hydraulic system for driving the first, second and third drive beams and the attached floor slats 48 is explained in my U.S. Pat. No. 5,301,798, the disclosure which is incorporated herein by reference.

The cargo supported by the floor slats 48 is moved in the desired direction by friction between the floor slats and the cargo. The inside surfaces of the side walls 22 and 24 must be flat and smooth to ensure that they do not hold cargo when the floor slats 48 are moved to the rear as described above. It is also desirable for the inside surfaces of the walls 22, 24 and 26 to be smooth and flat to prevent damage to cargo when it is being transported between a loading station and an unloading station.

A mounting plate 56 is provided with integral connector plates 58 as shown in FIG. 5. The connector plates 58 are secured to the ends of cross members 20 by huck bolts 60. The mounting plate 66 can be a single plate extending the full length of the trailer 10 or it can be a series of short plates extending between cross members 20. If the mounting plate 56 is a single plate, the connector plates 58 can be welded to the mounting plates or attached by mechanical fasteners. If the mounting plate 56 is a series of short plates extending between cross members 20, the connector plates 58 can be bent at 90° angles from each end of each short plate. A mounting plate 56 extends the full length of each side of the trailer 10 and across the front of the trailer.

A bottom rail 62 is secured to each mounting plate 56. The bottom rail 62 as shown in FIG. 5 is an extruded member with a small positioning flange 64 that sits on top of the mounting plate 56. A top flange 66 is connected to the floor assembly 40 to provide an edge seal between the wall 22, 24 or 26 and the floor assembly. The connection between the top flange 66 and the floor assembly 40 depends upon the floor construction used. A floor with slats 48 as described above will have a portion of a floor slat attached to the top flange 66. A trailer 10 with a wood floor will have screws or other fasteners passing through the flange 66 and into the wood. Trailers 10 with fixed metal floor assemblies 40 may have the top flange 66 welded to the floor.

The bottom rail 62 also has an outwardly extending bottom flange 68. The bottom flange 68 supports the walls 22, 24, and 26 of the trailer 10. In addition to providing support, the bottom flange 68 also protects the bottoms of the walls 22, 24 and 26 and helps keeps liquid from damaging cargo transported in the trailer 10.

The walls 22, 24, and 26 of the trailer 10 are made from a plurality of vertical extruded panels 70 shown in FIGS. 3 and 4. Each panel 70 is hollow and has an outside wall 72, and inside wall 74 a first end wall 76 and a second end wall 78. Intermediate walls 81 an 83 interconnect the outside wall 72 and the inside wall 74 between the first and second end walls 76 and 78. The intermediate walls 81 and 83 reinforce the outside and inside walls 72 and 74 and increase the strength of each panel 70. The number of intermediate walls 81 and 83 employed can be decreased or increased as required depending upon the width of each panel 70.

A first outside flange 80 and a first inside flange 82 are integral with the first end wall 76. The first outside flange 80 extends from a bottom 84 to a top 86 of each panel 70 and has an outside surface 89 in a common plane with the outside surface 88 of the outside wall 72. The first inside flange 82 is spaced from and parallel to the first outside flange 80.

A second outside flange 92 and a second inside flange 90 are integral with the second end wall 78. The second inside flange 90 extends from the bottom 84 to the top 86 of each panel 70 and has an inside surface 94 in a common plane with the inside surface 96 of the inside wall 74. The second inside flange 90 is spaced from and parallel to the second outside flange 92.

The vertical panels 70 are attached to each other by rivets 98 as shown in FIGS. 3 and 4. The first inside flange 82 is positioned between the second outside flange 92 and the second inside flange 90. The second outside flange 92 is positioned between the first outside flange 80 and the first inside flange 82. The rivet 98 holds the first outside flange 80 against the second outside flange 92 and holds the outside surface 89 of the first outside flange in a common plane with the outside surface 88 on an adjacent vertical panel 70. The rivet 98 also holds the first inside flange 82 against the second inside flange 90 and holds the inside surface 96 of the inside wall 74 in a plane with the inside surface 94 of the second inside flange 90. In the position described there is a substantial space between the first inside flanges 82 and the second outside flange 92 that in combination with the adjacent first and second end walls 76 and 78 forms a passage 99 that extends from the top 86 to the bottom 84 of two adjacent panels 70.

Seals are created wherein an edge 100 of the first outside flange 80 contacts the second end wall 78 of an adjacent panel 70. A seal is also created where the first outside flange 80 contacts the second outside flange 92 of the adjacent vertical panel 70. Seals are also created at the contact between the first end wall 76 and the edge 102 of the second inside flange 90 and between the first inside flange 82 and the second outside flange 90 of an adjacent vertical panels 70. Over hundreds of thousands of miles of travel over rough roads and the application and release of forces against the inside walls 74 by cargo, some of the four seals described above may leak. If there is leakage, it will be carried away by the passage 99. The bottom flange 68 of the bottom rail 62 covers the exit to the passages 99 but does not create a seal. Any liquid in the passages 99 will leak out. The bores 106 and 108 through the first outside flange 80 and the first inside flange 82 are in alignment and have a countersunk portion 110 in the first outside flange. The bores 112 and 114 through the second outside flange 92 and the second inside flange 90 are in alignment and have a countersunk portion 116 in the second outside flange. The heads 118 and 120 of the rivets 98 are fully contained in the countersunk portions 110 and 116 and have surfaces that are in the plane of the outside surfaces 88 or inside surface 96 of the outside wall 72 or the inside wall 74.

Figure 6:
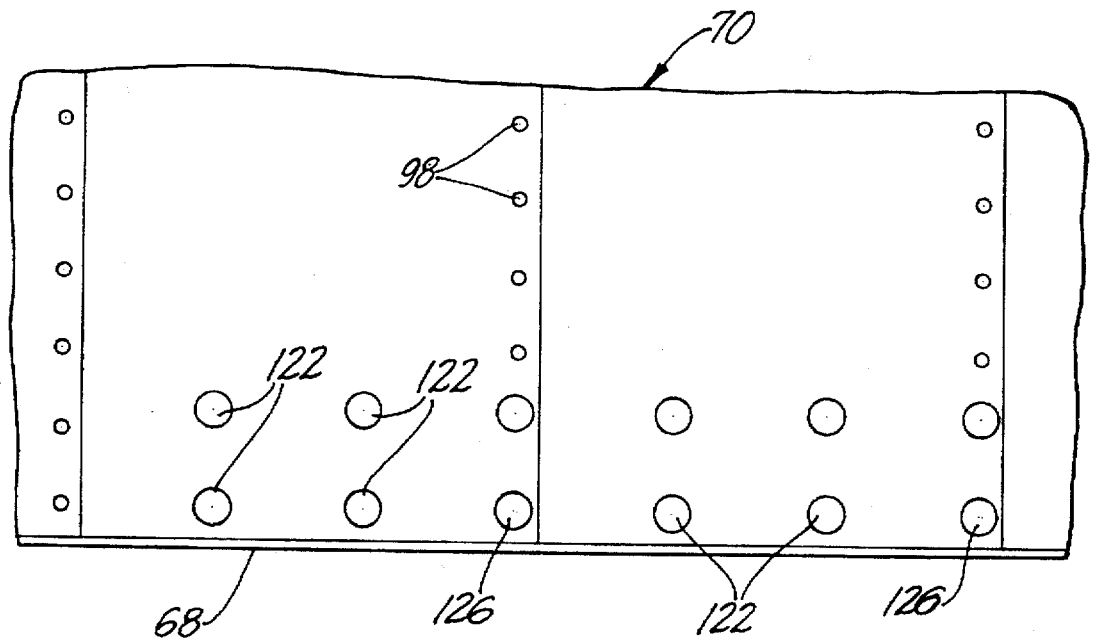
FIG. 6 an enlarged side elevation view with parts broken away showing the connection between wall panels and the bottom rail.

The vertical wall panels 70 are attached to the bottom rail by Huck bolts 122. These huck bolts 122 are adjacent to the intermediate walls 81 and 83 and the large heads 124 of the huck bolts overlap the intermediate walls so that they can be tightened and not deform the walls 72 or 74 of the panels 70. If desired spacers could be provided between the inside wall 74 and the outside wall 72 for the passage of huck bolts 122. With spacers, the huck bolts 122 would not be limited to positions adjacent to the intermediate walls 81 and 83. The huck bolts 122 pass through the bottom rail 62 as well as the mounting plate 56 to provide maximum strength and to facilitate removal of panels 70 for repair or replacement. Huck bolts 126 shown in FIG. 6, are preferably used in place of the rivets 98 to connect to panels 70 to each other and to the bottom rail 62 below the top of the I-beam 20 to facilitate the removal for replacement or repair of a panel 70.

A top rail 130 is attached to the top 86 of the panels that form the sidewalls 22 and 24 and the front wall 26 of the cargo compartment of the trailer 10. The top rail 130 is attached to the vertical panels 70 by huck bolts 132 as shown in FIG. 5. These huck bolts 132 are placed adjacent to the intermediate walls 81 and 83 and pass through the interlocked first and second outside and inside flanges 80, 90, 82, and 92 like the huck bolts 122, and 126 that connect the panels to the bottom rail 62. A lip 134 on the top rail 130 covers the top 86 of the panel 70 and closes the upper end of the passages in each panel. The top rails are also attached to the door frame 30. Corner sections are provided for connection of the side walls 22 and 24 to the front wall 26.

A damaged panel 70 can be removed by removing the huck bolts 122, 126, and 132 and the rivets 98 from at least three of the panels 70. The spacing between the first inside flange 82 and the second inside flange 92 permits one panel to be angled relative to an adjacent panel as shown in FIG. 4. Angling between three and six panels 70 will provide sufficient space to disengage the inside and outside flanges 80, 82, 90 and 92 at one connection between two adjacent panels. Then one or more of the panels 70 can be removed and replaced by new panels. The rivets 98 and the Huck bolts 122, 126 and 132 can be replaced and the trailer walls will be in new condition again. With this system, a damaged panel 70 can be replaced with minimal tools and equipment to return the trailer to like new condition in a few hours or less rather than a few days.

The panels 70 are preferably extruded aluminum. Each panel 70 is up to 10 feet or so long and 8 to 16 inches wide. However, the primary limitations on panel width 70 is the capacity of the extruding machine that makes the panels. The hollow spaces formed in the panel 70 could be filled with a foam like insulation material if desired. The foam would increase panel strength and provide some thermal protection for cargo. Additional cargo protection could be provided by attaching a top to the top rail 130 if an open top is not required for loading.

The panels 70 could also be extruded from a reinforced resin if desired. Some resin reinforced with carbon fibers or other high strength fibers have substantial strength and would be suitable for trailer walls. It is possible to extrude a panel 70 from a plastic material and provide a foam type core at the same time.

Obviously, many modifications and variations of the present invention are possible in light of the above teachings. It is, therefore, to be understood that within the scope of the appended claims the invention may be practiced otherwise then as specifically described.

I claim:

1. A wall for a trailer having an inside surface in a first vertical plane and an outside surface in a second vertical plane comprising a plurality of interconnected panels each of which is a hollow extruded member with an inside wall having an inside wall surface in said first plane, an outside wall having an outside wall surface in said second vertical plane, a first vertical end wall integral with a first edge of the inside wall and a first edge of the outside wall, a second vertical end wall integral with a second edge of the inside wall and a second edge of the outside wall, a first outside flange integral with the first end wall, a first inside flange integral with the first end wall, a second outside flange integral with the second end wall, a second inside flange integral with the second end wall, and wherein the first inside flange of a first panel is positioned between the second inside flange and the second outside flange of a second panel, the second outside flange of the second panel is positioned between the first inside flange and the first outside flange of the first panel, and a plurality of mechanical fasteners passing through the first outside flange of the first panel and the second inside flange of the second panel and holding a surface of the second inside flange in the first plane and holding a surface of the first outside flange in the second plane and wherein the first inside flange and second outside flange are spaced apart.

2. A wall for a trailer as set forth in claim 1 wherein the first outside flange of the first panel is in sealing contact with the second outside flange of the second panel and the second inside flange of the second panel is in sealing contact with the first inside flange of the first panel.

3. A wall for a trailer as set forth in claim 1 wherein the first outside flange of the first panel is in sealing contact with the second end wall of the second panel and the second inside flange of the second panel is in sealing contact with the first end wall of the first panel.

4. A wall for a trailer as set forth in claim 1 wherein each panel has a top end attached to a top rail and a bottom end attached to a bottom rail.

5. A wall for a trailer as set forth in claim 1 wherein each hollow extruded member has at least one intermediate wall integral with the inside wall and the outside wall that is between the first end wall and the second end wall.

6. A wall for a trailer as set forth in claim 5 wherein the at least one intermediate wall is parallel to the first end wall and the second end wall.

7. A wall for a trailer as set forth in claim 1 wherein the plurality of the mechanical fasteners have heads positioned entirely within countersunk portions of bores in the first outside flange of the first panel and the second inside flange of the second panel.

8. A wall for a trailer as set forth in claim 1 wherein a passage for drainage defined by the first end wall of the first panel, the second end wall of the second panel, the first inside flange of the first panel and the second outside flange of the second panel, is formed between the first panel and the second panel.

9. A wall for a trailer as set forth in claim 1 wherein the combined thickness, in a plane transverse to the first vertical plane and the second vertical plane, of the first outside flange and the first inside flange is less than one half the distance between the first vertical plane and the second vertical plane.

10. A trailer having a frame supported by at least one axle assembly; a least one bottom rail attached to the frame; at least one top rail supported by the frame; and a plurality of vertical panels secured to said at least one bottom rail and to said at least one top rail; each of said panels comprising an inside wall, an outside wall parallel to and spaced from the inside wall, a first vertical end wall integral with a first side of the inside wall and the outside wall, a second vertical end wall integral with a second side of the inside wall and the outside wall; a first outside flange integral with the first vertical end wall and having an outside surface in a common plane with an outside surface of the outside wall, a second inside flange integral with the second vertical end wall and having an inside surface in a common plane with an inside surface of the inside wall, a first inside flange integral with the first end wall and having an inside surface in a vertical plane that is parallel to and spaced from an inside vertical plane containing the inside surface of the inside wall, a second outside flange integral with the second end wall and having an outside surface in a vertical plane that is parallel to and spaced from an outside vertical plane containing the outside surface of the outside wall, and wherein the space between the first outside flange and the first inside flange exceeds the thickness of the first inside flange in a direction transverse to the inside and outside vertical planes, and wherein the space between the second outside flange and the second inside flange exceeds the thickness of the second outside flange in the direction transverse to the inside and outside vertical planes.

* * * * *